United States Patent [19]
Kuhlman

[11] Patent Number: 5,510,028
[45] Date of Patent: Apr. 23, 1996

[54] DEVICE FOR SEPARATING LIQUIDS

[76] Inventor: Delmar A. Kuhlman, 208 S. Bleckley Dr., Wichita, Kans. 67207

[21] Appl. No.: 308,849

[22] Filed: Sep. 19, 1994

[51] Int. Cl.[6] ....................................... C02F 1/40
[52] U.S. Cl. .................. 210/307; 210/335; 210/470; 210/514; 30/325; 99/496; 99/508
[58] Field of Search .................... 210/514, 470, 210/498, 499, 335, 299, 307, 314, 513; 30/324, 325, 326, 141; 99/495, 496, 508

[56] References Cited

U.S. PATENT DOCUMENTS

| | | | |
|---|---|---|---|
| D. 210,399 | 3/1968 | Wickmann | 210/470 |
| 858,291 | 6/1907 | Irby | 210/470 |
| 948,185 | 2/1910 | Mulheir | 210/470 |
| 2,575,768 | 11/1951 | Pearsall | 210/513 |
| 3,326,384 | 6/1967 | Wessels | 210/470 |
| 3,392,845 | 7/1968 | Shapiro et al. | 210/470 |
| 5,084,177 | 1/1992 | Keene | 210/514 |
| 5,182,860 | 2/1993 | Kuhlman | 30/325 |

*Primary Examiner*—Christopher Upton
*Attorney, Agent, or Firm*—Shook, Hardy & Bacon

[57] ABSTRACT

A device for separating liquids has a side wall enclosing an interior space. A bottom is connected to the side wall adjacent a lower edge of the side wall and has an aperture formed therein at a position above the lower edge. The bottom extends upwardly and inwardly toward the aperture such that as the device is forced downwardly into a combination of liquids, a liquid floating on top of another different liquid is forced through the aperture and contained by the side wall and the bottom portion.

17 Claims, 2 Drawing Sheets

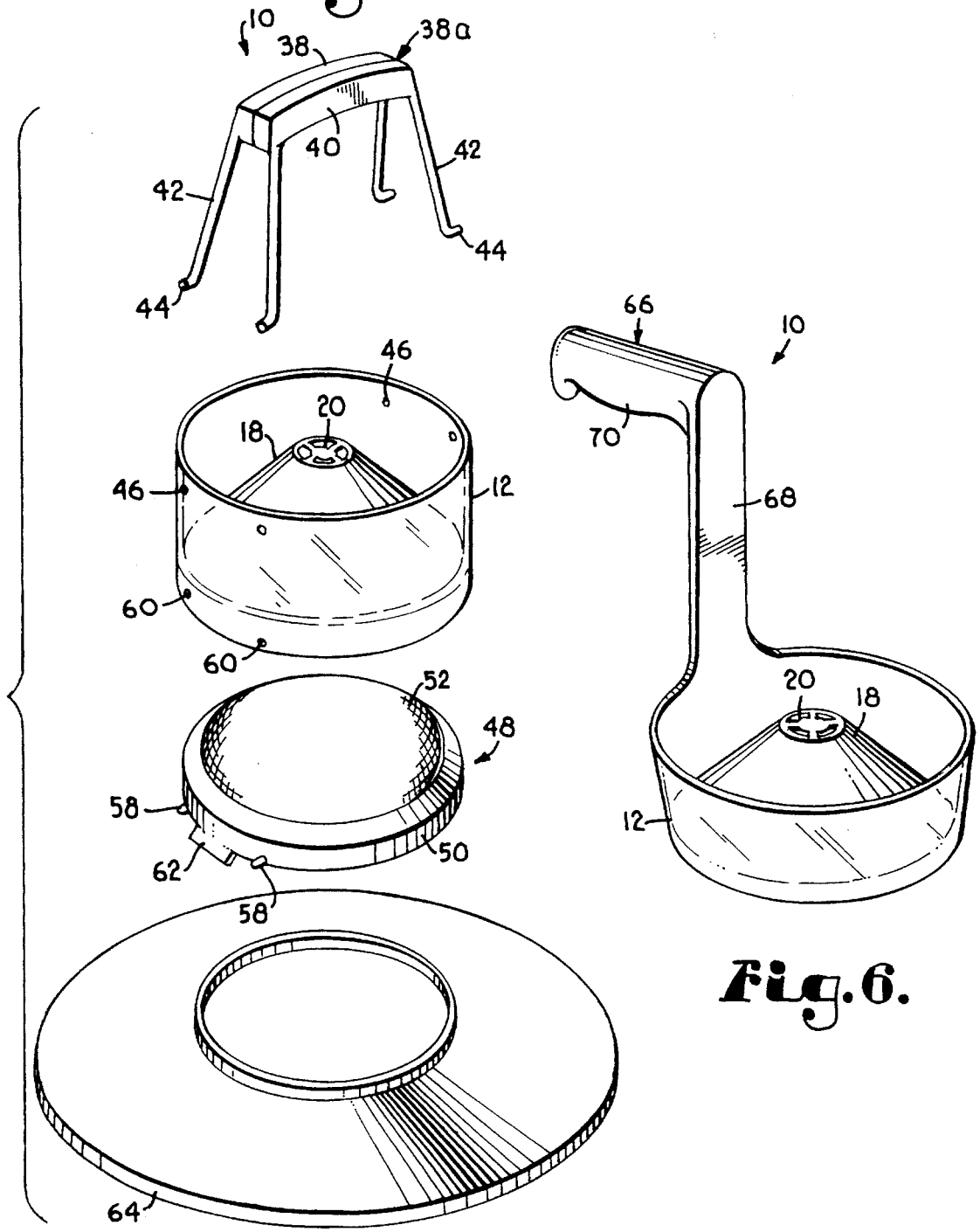

DEVICE FOR SEPARATING LIQUIDS

BACKGROUND OF THE INVENTION

This invention relates to a device for separating a liquid from a combination of liquids wherein the separated liquid is floating on the top surface of another different liquid.

Generally, when two liquids are combined, the liquid having the lower specific weight will float on the top surface of the liquid having the higher specific weight. A simple example of the above phenomenon is a combination of oil and water wherein the lighter oil will float on the top surface of the heavier water.

In many situations where there is a combination of liquids, it is desirous to separate the floating liquid from the other liquid. For example, during the cooking and preparation of soups, stews, chili, and sauces, animal fat from the soup stock or from the meat particles rises to the top surface of the soup, stew, or sauce. The harmful health effects of animal fat are well-known and well documented in today's society. Therefore, health-conscious individuals have attempted to remove or skim the fat from cooking liquids by using a spoon or other similar utensil. Further, these individuals have also attempted to pour the fat off of the cooking liquid by tilting the pot or pan in which the liquid is contained.

The above-described methods have not proved adequate for removing the fat from the cooking liquid. Skimming the fat from the surface with a spoon requires numerous skimming operations. Further, oftentimes the fat is not adequately removed by the skimming iterations with the spoon, and many times, the flavorful broth or sauce is accidentally skimmed and discarded with the fat. Attempting to pour the floating fat off of the cooking liquid also results in inadequate removal of the fat and accidental removal of the broth or sauce. Further, the handling of a hot pot or pan during the delicate pouring process can be dangerous to both the person pouring or to others in the area.

U.S. Pat. No. 5,182,860 discloses a skimmer for removing fat from a liquid. The skimmer disclosed in the patent includes a bowl member which is submersed in a liquid such that mainly floating fat and some of the broth or sauce flows into the bowl. The bowl is then removed from the cooking liquid and the fat floats to the top surface of the quantity of liquid disposed in the bowl. The bowl has an opening on its bottom surface which is opened and closed by actuating a trigger on a handle attached to the bowl. The opening is opened such that the broth or sauce in the bottom of the bowl can be drained back into the cooking pot. The opening is closed prior to the fat flowing through the opening. The fat then can be discarded from the bowl and the process repeated if needed. The skimmer of the patent adequately removes fat from soups or sauces and has been commercially successful. However, the skimmer has movably connected parts which can increase the cost of manufacturing the skimmer. Further, the skimmer requires that a user correctly position the bowl of the device within a liquid combination such that mainly fat flows into the bowl. Thus, a user is required to maintain the bowl of the device in a substantially level manner and to position the bowl along the top surface of the liquid combination so that the floating fat can flow therein. Therefore, the skimmer of the patent requires a user to exercise a certain amount of deftness in order to operate it.

A skimming device is needed which can easily and safely remove a liquid floating on the top surface of another different liquid with a minimal amount of effort and skill on the part of the device user. Further, a skimming device is needed which has a simple structure so that it can be easily manufactured and easily used.

SUMMARY OF THE INVENTION

An object of the invention is to provide a skimming device for removing a liquid floating on the top surface of another liquid which is more effective and which requires a minimal amount of effort on the part of the device user.

Another object of the invention is to provide a skimming device which utilizes the inherent tendency of a lighter liquid to remain on the top surface of a heavier liquid to force the lighter liquid into a collecting cavity.

A further object of the invention is to provide a skimming device which collects a liquid floating on the top surface of another liquid without collecting or requiring replacement of the other liquid.

A still further of the present invention is to provide a skimming device which has a simple structure such that it can be easily manufactured.

Another object of the invention is to provide a skimming device which allows the collection of a floating liquid in a safe manner.

According to the present invention, the foregoing and other objects are obtained by a skimming device having a side wall enclosing an interior space. A bottom is connected to the side wall adjacent a lower edge of the side wall. The bottom has an aperture formed therein at a position above the lower edge. The bottom extends upwardly and inwardly toward the aperture such that as the device is forced downwardly into a combination of liquids, a liquid floating on top of another different liquid is forced through the aperture and contained by the side wall and the bottom.

In accordance with another aspect of the invention, the side wall is circular in shape and the bottom is generally conical in shape.

These and other important aims and objectives of the present invention will be further described or will become apparent from the following description.

BRIEF DESCRIPTION OF THE DRAWINGS

In the accompanying drawings which form a part of the specification and are to be read in conjunction therewith and in which like reference numerals are used to indicate like parts in the various figures:

FIG. 5 is an exploded top perspective view of the skimming device of FIG. 1 and showing an optional extension skirt for positioning along the lower edge of the skimming device; and FIG. 6 is a top perspective view of a skimming device embodying the present invention and having an alternative handle structure.

DETAILED DESCRIPTION OF THE PREFERRED EMBODIMENTS

Figure 2:
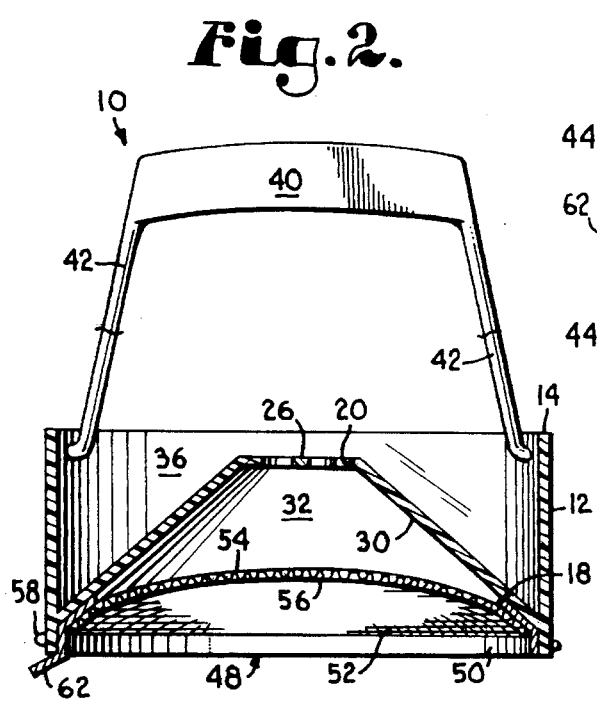
FIG. 2 is a detailed cross-sectional view taken along line 2—2 of FIG. 1.

A skimming device embodying the principles of the invention is broadly designated in the drawings by the reference numeral 10. Device 10 includes a circular continuous side wall 12 which has an upper edge 14 and a lower edge 16. Side wall 12 defines an interior space which is bounded on its lower end by a bottom 18. Bottom 18 is preferably formed integrally with and extends from the side wall 12 at a location adjacent the lower edge 16, as best shown in FIG. 2. Bottom 18 is frusto-conical in shape such that it extends upwardly and inwardly from the lower edge 16 of side wall 12.

Figure 4:
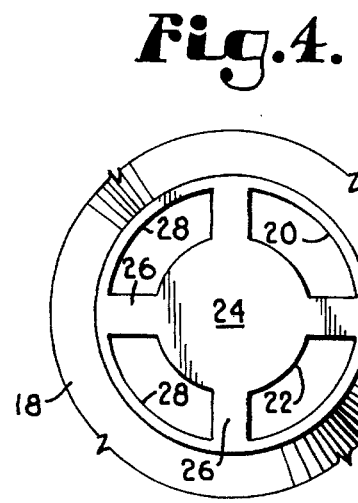
FIG. 4 is a fragmentary enlarged top plan view similar to FIG. 3 showing the straining structure positioned in the aperture of the bottom of the skimming device.

Bottom 18 has a separating aperture 20 formed generally at its center and generally at the apex of the frusto-conical shape of the bottom. Aperture 20 is located at a longitudinal location that is intermediate the lower edge 16 and the upper edge 14 of side wall 12. Aperture 20 extends in a generally horizontal direction and has a straining structure 22 disposed therein, as best shown in FIG. 4. Structure 22 is preferably formed integrally with the bottom 18 and has an inner solid circular portion 24 and arm portions 26. When structure 22 is molded in the aperture 20, elongated arcuate openings 28 are formed. It is through openings 28 that a floating liquid will flow during the separating operation, as will be more fully described below.

Lower surface 30 of bottom 18 forms a frusto-conical cavity 32 which serves to funnel and channel a floating liquid through the aperture 20 as device 10 is forced downwardly into a combination of liquids, as will be more fully described below. Upper surface 34 of bottom 18 together with the side wall 12 forms an annular receiving cavity 36 for receiving and holding the floating liquid after it has passed through aperture 20.

Side wall 12 and bottom 18 are described above and shown in the figures as being generally circular in shape. Side wall 12 and bottom 18, however, can be of any suitable configuration. For example, side wall 12 can be rectangular or polygonal in shape and bottom 18 can be generally pyramidal in shape. Further, bottom 18 is described above and shown in the figures as having generally straight angular portions extending inwardly and upwardly toward aperture 20. However, bottom 18 also can have a curved or arcuate shape such that the portions of bottom 18 extend upwardly and inwardly toward aperture 20 in a curved or arcuate fashion.

Side wall 12 and bottom 18 may be made of any suitable material, but are preferably manufactured of a transparent material sold under the trade name "LEXAN," which is a thermoplastic carbonate-linked polymer produced by reacting bisphenol A and phosgene.

Figure 1:
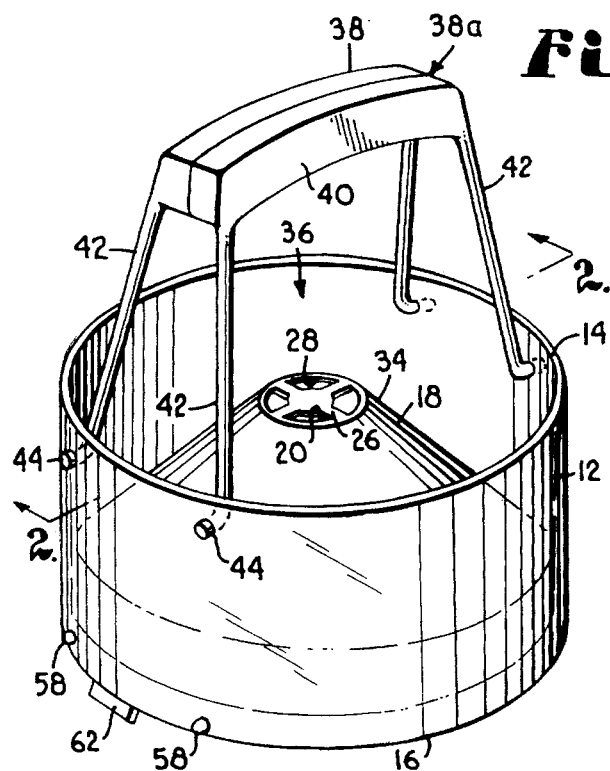
FIG. 1 is a top perspective view of a skimming device embodying the present invention.

Device 10 also has two handles 38 which are attached to side wall 12 adjacent upper edge 14. Handles 38 are snapped into holes 44 and can be held together at 38a so that an operator can operate device 10 with one hand. Handles 38 can also be pivoted away from one another so that an operator can operate the device with two hands. Handles 38 are also used to force device 10 downwardly into a combination of liquids. The handles also allow the user to manipulate the device during the separating process such that spillage of the separated-liquid is prevented. Further, the handles allow the user to invert the device after the floating liquid has been collected to dispose of the liquid. Handles 38 each have horizontal grasping portion 40 and attaching legs 42. Each attaching leg 42 has an attaching nub 44 which is pivotally received in a corresponding attaching aperture 46 extending through side wall 12, as best shown in FIGS. 1 and 5. The attaching legs 42 are made of a resilient material (for example, "LEXAN") such that they have an outward biasing force to hold them in their corresponding aperture 46. Handles 38 are attached to side walls 12 by forcing legs 42 inwardly, aligning the nubs 44 with the apertures 46, and allowing nubs 44 to snap into their corresponding apertures 46. Thus, the resilient nature of legs 42 allows secure attachment of handle 38 to side wall 12.

Figure 3:
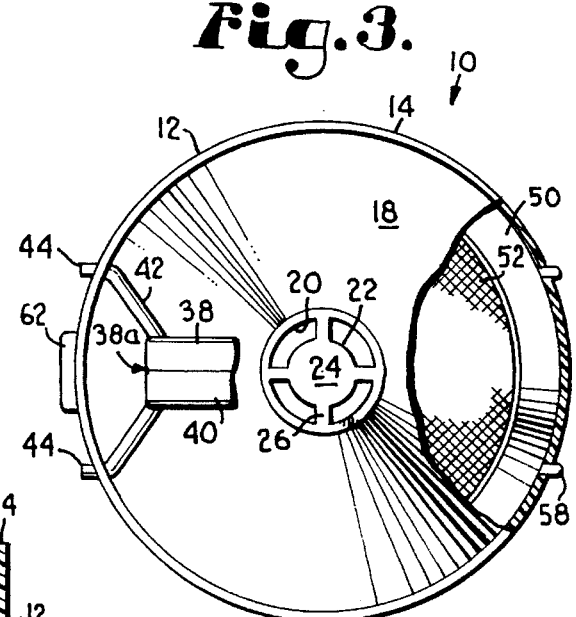
FIG. 3 is a top plan view of the skimming device of FIG. 1, parts being broken away and shown in cross section to reveal details of construction.

Device 10 also preferably has a snap-in screen filter 48, as best shown in FIGS. 2, 3, and 5. Screen filter 48 has an annular holding member 50 for holding a screen 52. Member 50 can be made of any suitable resilient material, for example, "LEXAN" . Screen 52 is preferably a wire mesh screen, but can be made of any suitable material, for example, plastic. Screen 52 generally has a shape such that its upper surface 54 is convex and its lower surface 56 is concave, as best shown in FIG. 2. Holding member 50 has a diameter which allows it to fit loosely within side wall 12 adjacent lower edge 16. Member 50 also has attaching nubs 58 extending from its outer peripheral surface for alignment with and receipt within attaching apertures 60 disposed through side wall 12. Filter 48 is attached to device 10 by deforming the resilient holding member 50 and the screen 52 such that the nubs 58 can be snapped into place within the apertures 60. Filter 48 also has a tab 62 to aid in the removal of filter 48.

In operation, the handles 38 and the filter 48 are snapped into position at their appropriate locations along the side wall 12. Device 10 is then positioned on the top surface of a combination of liquids wherein a first liquid is floating on top of a second liquid. Device 10 will tend to float on the top surface of the liquid combination and traps an amount of floating liquid underneath the bottom 18 and within the side wall 12. Filter 48 prevents solid particles, which may be suspended in the liquid combination, from entering the cavity 32. A user grasps the handle 38 and forces device 10 downwardly. As this is done, the floating liquid will be funneled or channeled by the lower surface 30 of bottom 18 toward and through the aperture 20. After the floating liquid flows through the aperture 20, it then flows downwardly along the upper surface 34 of bottom 18 and is contained in the receiving cavity 36. The user maintains a downward force until the second liquid supporting the floating liquid approaches or starts to flow through the aperture 20. The transparent nature of the material of which the side wall 12 and the bottom 18 are made allows the user to visually inspect when the second liquid approaches the aperture 20. The inherent tendency of the lighter floating liquid to remain on the top surface of the heavier liquid is utilized in combination with the shape of the bottom 18 to force the floating liquid through the aperture 20 and into the receiving cavity 36. Thus, the user can discontinue the downward force shortly before any of the second supporting liquid flows through aperture 20.

After the user has forced the device downwardly such that the second supporting liquid approaches the aperture 20 as described, the user then guides the device 10 upwardly using handles 38. It has been found that the upward movement of the device 10 within the liquid combination without removing the device therefrom provides a suction-type effect such that floating liquid not originally contained underneath the bottom 18 and within the side wall 12 is drawn therein by the upward movement. The downward movement can then be repeated to remove the additional floating liquid drawn under the bottom 18. Thus, several iterations of the cycle mentioned above likely will remove all the floating liquid from the top surface of the supporting liquid.

After the floating liquid has been collected in the receiving cavity 36, device 10 can be inverted and the floating liquid properly disposed of.

Device 10 can be used without the filter 48. If it is used in such a configuration, the straining structure 22 will prevent particles and material suspended in the liquid combination from passing through the aperture 20. As is apparent, the filter 48 can be used when there are smaller particles present within the liquid combination, and the straining structure 22 will be adequate when only larger particles are present within the liquid combination.

With reference to FIG. 5, device 10 optionally can be fitted with an extension skirt 64. Skirt 64 can be attached to the lower edge of device 10 in any suitable manner, for example, by a snapping arrangement or structure. Skirt 64 provides a larger cover area for a floating liquid such that, when device 10 is moved downwardly, most if not all of the floating liquid will be collected with a single downward movement. Skirt 64 can have an appropriate diameter to fit a particular sized container in which the liquid combination is located. Further, skirt 64 can be made of any suitable material, for example, a heat-resistant plastic.

FIG. 6 shows a skimming device 10 with an alternative handle structure 66. Handle 66 has an extension portion 68 formed integrally with side wall 12 and a horizontal grasping portion 70. The device shown in FIG. 6 with alternative handle structure 66 operates in the same manner described above, and can also be fitted with screen filter 48 and/or extension skirt 64. Handle 66, like handles 38, allows manipulation of the device during the separating process such that spillage of the separated liquid is prevented and allows inversion of the device to dispose of the collected liquid.

As described above, skimming device 10 provides an easy and convenient way for removing a floating liquid from a liquid combination. The device utilizes the inherent tendency of a lighter liquid to remain on the top surface of a heavier liquid in conjunction with the shape of the bottom 18 to funnel or channel the lighter liquid through the aperture 20 and into the receiving cavity. The one-piece structure of side wall 12 and bottom 18 can be easily manufactured. Further, there are no moving parts to wear or which would require complex manufacturing techniques. Additionally, the snap-on structure of the handles 38 and the screen filter 48 provide for easy assembly and for easy disassembly for cleaning purposes.

Skimming device 10 described above is especially useful for removing fat from the top of a pot or pan in which a soup, chili, stew, or sauce is cooking. However, the use of skimming device 10 is not limited to cooking situations, but can be used in any situation wherein it is desirous to remove a floating liquid from a liquid combination. One such situation where the device may be advantageous is for use in waste treatment and disposal.

Having thus described the invention, what is claimed is:

1. A device for separating liquids comprising:

A side wall enclosing an interior space;

a bottom connected to said side wall adjacent a lower edge of said side wall, said bottom having an aperture formed therein at a position above said lower edge, said bottom extending upwardly and inwardly toward said aperture such that as the device is forced downwardly into a combination of liquids, a liquid floating on top of another different liquid is forced through said aperture and contained by said side wall and said bottom; and a screen filter positioned adjacent said lower edge of said side wall such that liquid passes through said screen filter before reaching said aperture.

2. The device of claim 1, wherein said side wall is circular in shape.

3. The device of claim 1, further comprising at least one handle attached to said side wall for allowing a user to force the device downwardly into the combination of liquids.

4. The device of claim 1, wherein said bottom is generally conical in shape.

5. The device of claim 4, wherein said aperture is positioned generally at the apex of said conical-shaped bottom.

6. The device of claim 1, wherein said aperture has a straining structure disposed therein for preventing the flow of particles through said aperture.

7. The device of claim 1, wherein said screen filter is shaped such that it has a downwardly facing concave surface.

8. The device of claim 1, wherein said screen filter is removably attached to said side wall.

9. The device of claim 1, further comprising an extension skirt surrounding said lower edge of said side wall such that a greater surface area of floating liquid can be covered by the device.

10. A device for separating liquids comprising:

a side wall enclosing an interior space;

a bottom connected to said side wall adjacent a lower edge of said side wall, said bottom having an aperture formed therein at a location above said lower edge, said bottom also having a lower surface which forms a downwardly facing first cavity for forcing liquid through said aperture when the device is forced downwardly into a combination of liquids;

wherein said side wall and an upper surface of said bottom form a second cavity for receiving a liquid that has been separated from the combination of liquids; and a screen filter positioned adjacent said lower edge of said side wall such that liquid passes through said screen filter before reaching said aperture.

11. The device of claim 10, wherein said first cavity is generally conical in shape.

12. The device of claim 11, wherein said aperture is positioned generally at the apex of said conical-shaped first cavity.

13. The device of claim 10, wherein said side wall is circular in shape.

14. The device of claim 10, wherein said aperture has a straining structure disposed therein for preventing the flow of particles through said aperture.

15. The device of claim 10 wherein said screen filter is shaped such that it has a downwardly facing concave surface.

16. A device for separating fluids comprising:

a circular side wall;

a conical-shaped bottom, said bottom connected to said side wall adjacent a lower edge of said side wall, said bottom also including an aperture formed adjacent the apex of the conical-shaped bottom;

at least one handle attached to said side wall; and a screen filter positioned adjacent said lower edge of said side wall such that liquid passes through said screen filter before reaching said aperture, wherein, when the device is forced downwardly into a combination of liquids, a liquid floating on top of another different liquid is forced through said aperture and is collected in a cavity formed by said bottom and said side wall.

17. The device of claim 16, wherein said aperture has a straining structure disposed therein for preventing the flow of particles through said aperture.

\* \* \* \* \*